United States Patent
Lee et al.

(10) Patent No.: US 7,640,434 B2
(45) Date of Patent: Dec. 29, 2009

(54) IDENTIFICATION OF UNDESIRABLE CONTENT IN RESPONSES SENT IN REPLY TO A USER REQUEST FOR CONTENT

(75) Inventors: Frank Lee, Taipei (TW); Jeremy G. Liang, San Jose, CA (US); Eva Chen, Pasadena, CA (US); Yi-Jing Lin, Taipei (TW)

(73) Assignee: Trend Micro, Inc. (JP)

( * ) Notice: Subject to any disclaimer, the term of this patent is extended or adjusted under 35 U.S.C. 154(b) by 608 days.

(21) Appl. No.: 10/043,910

(22) Filed: Jan. 11, 2002

(65) Prior Publication Data

US 2002/0178381 A1 Nov. 28, 2002

Related U.S. Application Data

(60) Provisional application No. 60/333,552, filed on Nov. 26, 2001.

(51) Int. Cl.
| | |
|---|---|
| H04L 29/06 | (2006.01) |
| G06F 21/00 | (2006.01) |
| H04L 9/32 | (2006.01) |
| G06F 11/30 | (2006.01) |
| G06F 17/00 | (2006.01) |
| G06F 12/14 | (2006.01) |
| G06F 15/177 | (2006.01) |
| G06F 15/173 | (2006.01) |

(52) U.S. Cl. .................. 713/182; 713/153; 713/168; 713/188; 726/3; 726/11; 726/12; 726/13; 726/22; 709/220; 709/224

(58) Field of Classification Search ......... 713/182–202; 709/200–220
See application file for complete search history.

(56) References Cited

U.S. PATENT DOCUMENTS

| 5,832,208 | A | * | 11/1998 | Chen et al. ............... 726/24 |
|---|---|---|---|---|
| 5,835,726 | A | | 11/1998 | Shwed et al. |
| 5,889,943 | A | * | 3/1999 | Ji et al. ................... 713/201 |
| 6,088,803 | A | * | 7/2000 | Tso et al. ................. 726/22 |
| 6,092,101 | A | * | 7/2000 | Birrell et al. ............ 709/206 |
| 6,119,165 | A | * | 9/2000 | Li et al. ................... 709/229 |
| 6,185,625 | B1 | * | 2/2001 | Tso et al. ................. 709/247 |
| 6,185,680 | B1 | * | 2/2001 | Shimbo et al. .......... 713/160 |
| 6,266,681 | B1 | * | 7/2001 | Guthrie .................. 715/501.1 |
| 6,321,267 | B1 | * | 11/2001 | Donaldson .............. 709/229 |
| 6,421,733 | B1 | * | 7/2002 | Tso et al. ................. 709/246 |

(Continued)

*Primary Examiner*—William R Korzuch
*Assistant Examiner*—Aravind K Moorthy
(74) *Attorney, Agent, or Firm*—Beyer Law Group LLP

(57) ABSTRACT

A system identifies undesirable content in responses sent to a user, such as in e-mail or in downloadable files, from an Internet or intranet site. The system utilizes a redirection program that identifies content requests from a user to a target server. The redirection program redirects the request to a proxy server that sends the request to the target server. Upon receipt of the response from the target server, the proxy server scans the response, which includes any attachments, for undesirable content, such as junk e-mails, computer viruses, pornographic material, and/or other undesirable content. The proxy server then acts upon the response, and any undesirable content, in accordance with default or user-defined parameters, such as removal of the undesirable content. The proxy server may then send the response, as modified, or a notification message to the redirection program forwarding to the user.

23 Claims, 8 Drawing Sheets

U.S. PATENT DOCUMENTS

| | | | |
|---|---|---|---|
| 6,609,196 B1 * | 8/2003 | Dickinson et al. | 713/154 |
| 6,687,732 B1 * | 2/2004 | Bector et al. | 709/200 |
| 6,728,885 B1 * | 4/2004 | Taylor et al. | 726/24 |
| 6,742,047 B1 * | 5/2004 | Tso | 709/246 |
| 6,772,196 B1 * | 8/2004 | Kirsch et al. | 709/206 |
| 6,779,021 B1 * | 8/2004 | Bates et al. | 709/206 |
| 6,804,780 B1 * | 10/2004 | Touboul | 713/181 |
| 6,851,061 B1 * | 2/2005 | Holland et al. | 726/23 |
| 6,898,715 B1 * | 5/2005 | Smithson et al. | 726/24 |
| 7,013,343 B2 * | 3/2006 | Shigezumi | 709/232 |
| 7,143,438 B1 * | 11/2006 | Coss et al. | 726/11 |
| 2002/0016826 A1 * | 2/2002 | Johansson et al. | 709/207 |
| 2002/0104017 A1 * | 8/2002 | Stefan | 713/201 |
| 2002/0133586 A1 * | 9/2002 | Shanklin et al. | 709/224 |
| 2002/0147780 A1 * | 10/2002 | Liu et al. | 709/206 |

* cited by examiner

IDENTIFICATION OF UNDESIRABLE CONTENT IN RESPONSES SENT IN REPLY TO A USER REQUEST FOR CONTENT

This application claims the benefit of U.S. Provisional Application No. 60/333,552, flied Nov. 26, 2001, which is herein incorporated by reference.

FIELD OF THE INVENTION

The present invention relates generally to information analysis and screening using a computer, and, specifically, to configurations and methods for intercepting and removing undesirable content from transmitted media, such as junk electronic mail, pornographic material, and computer viruses.

BACKGROUND OF THE INVENTION

Presently, growing use of distributed networks, such as the Internet and intranets, provides computer users with access to a wide variety of web sites having diverse content. Many networks, such as the Internet, enable the sending and receipt of electronic mail (e-mail) and download of content, such as file transfers, from other networks or users on the network.

A computer user may send e-mail messages (e-mails), including attachments, to another computer user, e.g., to an e-mail account, and receive e-mail from other computer users. Similar to physically delivered posted mail, e-mail may contain desired as well as undesired content. Three current problems associated with e-mail transmissions are the receipt of "junk" or unsolicited e-mails, the inclusion of computer viruses, and the inclusion of pornography.

Junk e-mails are e-mails that, again similar to physically delivered mailings, are often unsolicited by the receiver. They can include advertising, solicitations, and other undesirable content.

A computer virus is a piece of programming code usually disguised as something else that causes some unexpected and usually undesirable event (for the victim). Viruses are often designed so that they automatically spread to other computer users across network connections. For instance, viruses can be transmitted by sending them as attachments to an e-mail, by downloading infected programming from other web sites, and/or by importing them into a computer from a diskette or CD-ROM. The source application that deals with the e-mail, downloaded file, or diskette is often unaware of the virus. Some viruses wreak their effect as soon as their code is executed; other viruses lie dormant until circumstances cause their code to be executed by the computer. Some viruses can be quite harmful, causing a hard disk to require reformatting or clogging networks with unnecessary traffic, as earlier described.

Many computer users, web sites, and networks, utilize anti-virus (or "anti-viral") programs that search computer code, such as that found on a computer's hard drive and floppy disks, for any known or potential viruses. The market for this kind of program has expanded because of Internet growth and the increasing use of the Internet by businesses and individuals concerned about protecting their computer assets.

With the improvement of anti-virus technology, virus technology has improved too. Earlier viral forms were generally executable code and the propagation of the virus was through physical media, for example, floppy disks. With more recent viral forms, the host platform is usually a computer application that runs on an operating system, and the host object is typically a document, such as application documents, or e-mail, and the virus is propagated through networks, such as the Internet or intranets. To keep pace with the evolution and deployment of new viruses, a computer user should purchase and/or update the anti-viral program protecting their computer and/or network. A computer user may be vulnerable to newer viral forms if the anti-viral program is not current.

FIG. 1 illustrates a prior art example of a network configuration that enables a user on a network to send a request for and receive a response from a target server. In the present illustration, the access to the target server is hosted by a service provider over a network, such as the Internet. The request typically includes a request to retrieve content, such as a listing of e-mails in an e-mail account, an individual e-mail, an attachment to an e-mail, or a downloadable file (in the case of a user using the Internet to access a web site). In some instances, the user may be requesting the content from a small network, such as a home network having only one or a few network access devices or from a stand-alone computing device. In other instances, the user may be requesting the content from a larger network, such as a corporate intranet of hundreds of network access devices. In either situation, a user typically inputs the request for content via a device 102 that enables access to the service provider. The device 102 may take many forms, such as a personal computer, a personal digital assistant (PDA), a network browser device, etc.

Many networks also include other devices that enable transmissions to the network service provider or that provide additional features to the network. For example, some networks may utilize a modem 108, such as a cable modem, which enables communication to the network service provider. Some networks may also utilize other network devices 110, such as a firewall device, router, or Internet access sharing device, that protect or augment the network. Some devices 110 may incorporate several of the above functions as well as other functions, for example, surge protection. In these networks, the request and response are typically communicated through those devices as well. In some instances, some responses may not be permitted into the network, such as unauthorized transmissions blocked by a firewall.

Typically, the user enters a request for content via a device 102 utilizing a browser application that supports protocols for various types of transmissions on the Internet, such as hypertext transfer protocol (HTTP) in the case of e-mails and file transfer protocol (FTP) in the case of downloaded, or transferred, files from a web site. The request is communicated from the device 102 to a network service provider 112, such as a cable operator or Internet Service Provider (ISP). The network service provider 112 communicates the request over the Internet 114, or via cable, to the appropriate target server 116 having access to the requested content. The target server 116 accesses the requested content and communicates a response including the requested content over the Internet 114, or other network, to the network service provider 112. The response may be, for example, a listing of all unread e-mail, a particular e-mail, an e-mail attachment, or a downloaded file (as when a user accesses a web site). The network service provider 112 then communicates the response back to the user. Thus, the response, including the content, is communicated into the user's local network (if any) and may be communicated all the way to an application residing on a device 102.

If the requested content was a listing of all incoming unread e-mails, the user may receive a list containing both desirable and junk e-mails. Often a user may be viewing a large listing of junk e-mails interspersed with desired e-mails. When a user receives the requested e-mail account information, he/she must then review individual junk e-mails in order to glean the desired e-mails. Further, the user typically deletes the junk e-mails so that their allocated space available on the mail server is not taken up holding the undesirable junk e-mails. This process is both time consuming and annoying to most e-mail users.

In some instances, an e-mail may contain a computer virus. Where an anti-viral program is not present on device 102 or the associated network, the user may expend time reviewing an e-mail attachment before deciding whether to open the attachment. In some cases, a user may not be able to determine whether the attachment is benign and may unwittingly open a virus attachment that damages the network.

Where an anti-viral program is present on device 102, the anti-viral program may detect and identify a known virus in an e-mail, so that the user does not have to expend time evaluating the e-mail. In some instances, the anti-viral program may also disable or delete the e-mail, further freeing a user from review of undesired e-mail data. It is important that the user vigilantly update the anti-viral program as a preventative measure against new viruses.

To attempt to circumvent possible transmission of a virus to an individual input device 102 on a network, some larger networks implement anti-viral programs at the e-mail server for the network. This is advantageous for larger networks where the client owns the e-mail server, as individual input devices 102 must be reconfigured when the application is upgraded. Where the owner of the e-mail server cannot control the reconfiguration of accessing input devices with each upgrade, this implementation is usually not as effective because the owner cannot ensure the installation of the upgrade on each accessing input device.

Some firewall systems may stop communication of the e-mail to the user if the e-mail is not from a sender that is given access; however, many viruses now spread through address systems so that the e-mail appears to come from a known sender who may have been given access through the firewall. Thus, these types of firewall systems may not be completely effective.

In other instances, an e-mail message may include pornographic material, graphic depictions of violence, or other objectionable material based on religious, moral or other grounds. As opposed to junk e-mail, which is bothersome, and a computer virus, which can damage a network, the above types of content are highly objectionable to many people and are "undesirable." It can prove difficult for a parent, school, church, or workplace to screen out such undesirable content from incoming e-mail messages.

Download of such undesirable content from a web site is also a growing concern, both to parents in a home network environment and to network supervisors attempting to prevent download of unauthorized or possibly litigious content onto their network and peripheral devices. As opposed to such undesirable content being received in an e-mail message, in this situation, a user is explicitly downloading such undesirable content by accessing a web site.

In some instances, requested downloadable content may contain undesirable content. For example, unbeknownst to a user, a requested downloadable file may contain pornographic material that is not seen by the user on the web site, but appears in the downloaded file. In another example, a minor in a home setting may request undesirable content against parental guidelines. In another example, an employee may request undesirable content for download to a company's computer against company guidelines. As illustrated in FIG. 1, a user has little control over receipt of undesirable content, such as junk e-mail, computer viruses, or pornographic material, whether the content arrives in an e-mail message or via access to a web site. Accordingly, what is needed in the field is a method and/or apparatus that enables a user on a network to control the type of content that is received at the network. Further, it would be advantageous if the method and/or apparatus enabled a user to remove undesirable content before it is received on the network.

SUMMARY OF THE INVENTION

To achieve the foregoing, and in accordance with the purpose of the present invention, a system and method for identifying undesirable content in responses sent in reply to a user request for content, such as e-mail or downloadable files, are described. The present invention utilizes a redirection program that identifies content requests from a user to a target server. The redirection program redirects the request to a proxy server that sends the request to the target server. Upon receipt of the response from the target server, the proxy server scans the response, including any attachments, for undesirable content, such as junk e-mails, computer viruses, pornographic material, and/or other undesirable content. The proxy server then processes the response, and any undesirable content, in accordance with default or user-defined parameters, such as removal of the undesirable content. The proxy server may then send no response, the response, as modified, or a notification message to the user.

According to one aspect of the present invention, a system for identifying undesirable content in responses sent in reply to a user request for content is described. The system includes: a user input device that generates a request for content including an address of a target server; a scan module that receives the user request for content and identifies the request as a request for content; a proxy module that modifies the request for content to be redirected to a proxy server; a network that routes the request for content to the proxy server; and a proxy server that receives the request, forwards the request to the target server, and receives a response from the target server.

In some embodiments, the proxy server identifies undesirable content in the response and processes the response according to defined parameters.

According to another aspect of the present invention, a method for identifying undesirable content in responses sent in reply to a user request for content is described. Input is received from a user including at least one request for content addressed to a target server. The request for content is identified and redirected to a proxy server. The proxy server receives the request for content and sends the request for content to the target server for generation of a response. The proxy server receives the response from the target server, scans the response for undesirable content, and processes the response according to defined parameters.

In some embodiments, the system may further identify undesirable content in the response, modify the response to remove the undesirable content and send the modified response from the proxy server to the user.

Another aspect of the present invention pertains to computer program products including a computer readable medium on which is stored program instructions for implementing the system and/or methods described above.

These and other aspects and advantages of the present invention will become apparent upon analysis of the following detailed descriptions and studying the various figures and drawings.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Figure 1:
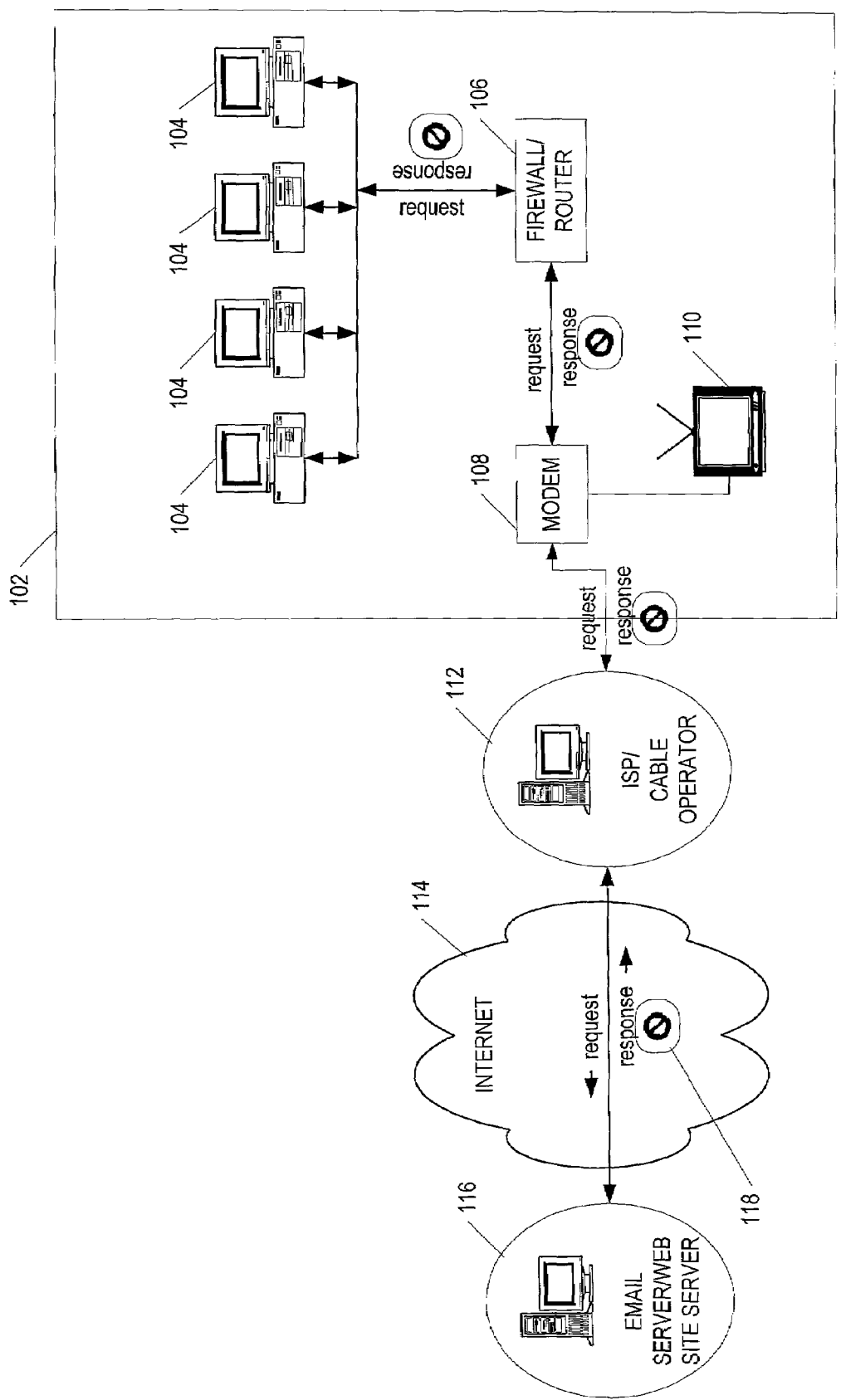
FIG. 1 illustrates a prior art example of a network configuration that enables a user on a network to send a request for and receive a response from a target server.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail so that the present invention will not be unnecessarily obscured in any way, for example, decoding and re-encoding of messages, basic transmission protocols and pathways, and applications.

The present invention provides a system and method for identifying undesirable content in responses sent in reply to a user request for content, such as an e-mail request or downloadable files requested from a web site. The present invention utilizes a redirection program that identifies content requests from a user to a target server. The redirection program redirects the request to a proxy server that then sends the request to the target server. Upon receipt of the response from the target server, the proxy server scans the response (including any attachments) for undesirable content, such as junk e-mails, computer viruses, pornographic material, and/or other undesirable content. The proxy server then acts upon the response, and any undesirable content, in accordance with default or user-defined parameters, such as removal of the undesirable content. For example, the proxy server may then send no response, the response, as modified, or a notification message to the redirection program for forwarding to the user.

The definition of "undesirable" may not necessarily be applied by the user, but rather may be so defined by parents, a manager, or a network supervisor. Thus, "undesirable" content can be a broadly defined concept that includes any content not wanted on the network, such as pornographic material, depictions of violence, and other such objectionable material, as well as junk e-mail and computer viruses.

In one embodiment, a redirection program present on a user's network (or stand-alone computer), identifies outbound requests for content, such as e-mails or web site content, e.g., downloadable files. The request is originally directed to a target server. In the context of the present invention, the target server will represent any entity that is capable of processing the request for content and sending a response. The redirection program modifies the request so that the request is redirected to a proxy server. The proxy server receives the modified request and sends the request to the target server for processing of the request. Upon receipt of the response from the target server, the proxy server scans the response for undesirable content, such as junk e-mails, computer viruses, pornographic material, and/or other undesirable content. The proxy server then acts upon the response according to parameters defined by default or user-defined configuration, for example, by removing any undesirable content from the response, deleting junk e-mails, quarantining the response, or some other defined action. If so desired, the proxy server may then transmit the response to the user, for example, without the undesirable content, with a notification message, or in accordance with some default or user selected parameter.

High Level Description of System

Figure 2:
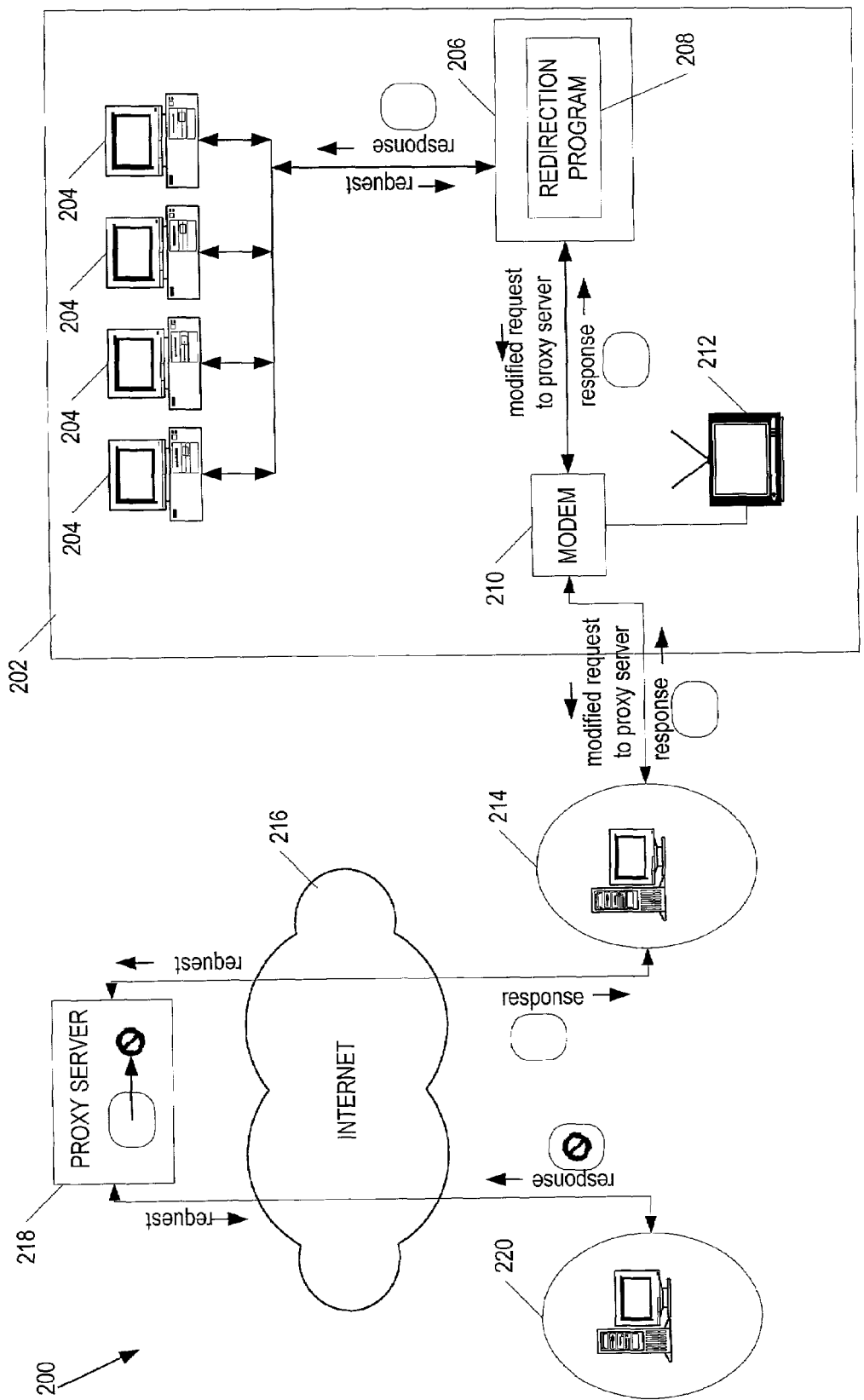
FIG. 2 is an example of a system for identifying undesirable content in responses sent in reply to a user request for content according to one embodiment of the present invention.

FIG. 2 is an example of a system for identifying undesirable content in responses sent in reply to a user request for content according to one embodiment of the present invention. The present invention includes a redirection program 208 and a proxy server 218. For purposes of illustration, a user on a network 202 enters a request for content from target server 220 on an input device 204, such as a computer. This request may be, for example, to view unread e-mails in an e-mail account, to read a particular e-mail, to read a particular e-mail attachment, or to view content from a web site, i.e., request transfer of a downloadable file. The redirection program 208 detects the request for content and modifies the request so that it is redirected to the proxy server 218.

In a preferred embodiment, the redirection program 208 is implemented as part of a network gateway device 206 attached to the network 202 that may include other network components, such as a firewall, and/or routing device. As the redirection occurs at the redirection program 208, the implementation of the present invention is "invisible" to the input device 204. This avoids having to install any upgrades at the input device 204. It will be appreciated that the redirection program may also be implemented differently, for example, as a separate device having no additional functions, or on another network device. Redirection program 208 may also be implement on device 204, if desired.

The modified request may be communicated to the proxy server 218 through various communication paths. For example, the modified request may be communicated from gateway device 206 to a modem 210 that provides connection of the network 202 to a service provider 214, such as an ISP or cable operator. The service provider 214 then communicates the modified request to the proxy server 218, such as over the Internet as shown, or along another path, such as an intranet cable connection. The proxy server 218 may be located at a variety of locations, such as a data center, an ISP, a cable operator, or at a company server.

The proxy server 218 receives the modified request, removes the redirection modification, and sends the request to the target server 220. The target server 220 processes the request and returns a response to the proxy server 218. In the present illustration, the response includes undesirable content denoted by a circle with a diagonal slash.

The proxy server 218 scans the response, which includes any attachments, for undesirable content. If undesirable content is found, the proxy server 218 processes the response according to default or user-defined parameters. For example, if the response was a listing of all unread e-mails, the proxy server 218 may delete all junk e-mails in the listing and send a notification message to the user of the number of junk e-mails deleted together with the remaining e-mails. As another example, if the response was a selected e-mail containing a computer virus as an attachment, the proxy server 218 may delete the e-mail or the attachment containing the computer virus and send a notification message to the user. As a further example, if the response was a downloadable file containing undesirable content, such as pornographic material, the proxy server 218 may delete the pornographic material found in the downloadable file and send the user the response including the downloadable file without the pornographic material. It will be appreciated that the above examples are only illustrative of a wide variety of actions that may be taken in regard to a response containing undesirable content.

After processing the response according to the default and/or user-defined parameters, the proxy server 218 may or may not send the remaining portion of the response back to the user. In some instances, where the response is not sent back to the user, the proxy server 218 may instead generate and send a notification message to the user.

It will be appreciated that utilization of the present invention enables undesirable content to be detected and removed at the proxy server 218 before it is received on the user's network 202. This enables a user to have junk e-mails deleted from an e-mail listing prior to viewing, so that the user may better utilize their time reviewing desired e-mails. Further, the user does not have to continually upgrade anti-viral programs at each input device 204 or at access control points, as the scanning is performed at the proxy server 218. Additionally, the user can proactively implement network content policy by deleting any prohibited content before it reaches the network.

Figure 3:
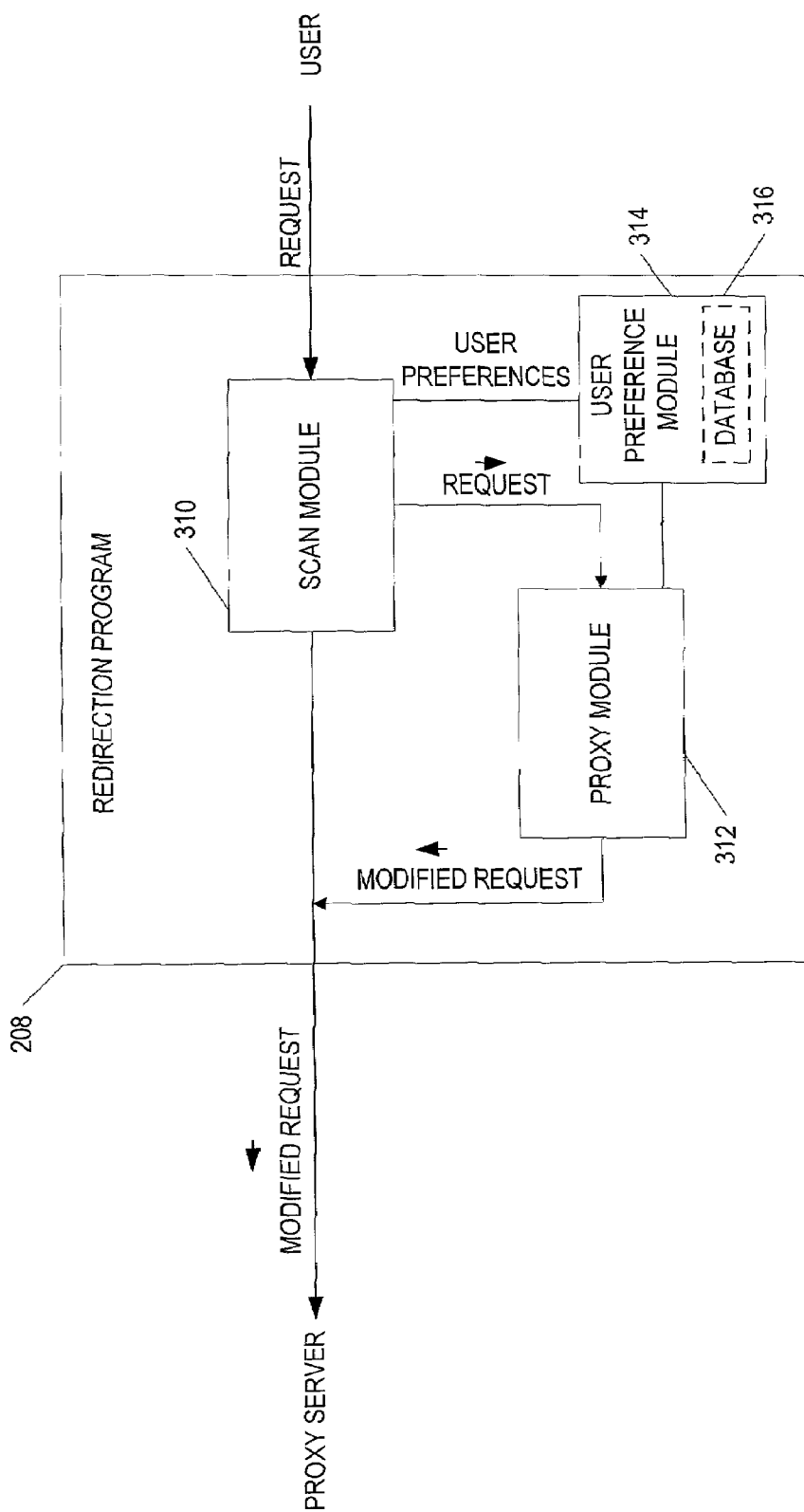
FIG. 3 illustrates an example of a redirection program according to one embodiment of the present invention.

FIG. 3 illustrates an example of a redirection program according to one embodiment of the present invention. In a preferred embodiment, the redirection program 208 includes a request scan module 310 for detecting a user request for content, such as an e-mail or downloadable file, and a proxy module 312 for redirecting the request to the proxy server. The redirection program 208 may also include a user preference module 314 for receiving and storing user preferences related to scanning parameters.

In one embodiment, the user may input desired scan and response parameters to the redirection program 208 for use by the proxy server in processing a response. For example, using a browser application, a user may input preferred scan and response parameters to a gateway device in which the redirection program is resident. This input is received by the user preference module 314 of the redirection program 208 which then stores the user-defined parameters in a memory structure, such as a database 316, for communication to the proxy server. In one embodiment, the user-defined parameters may be sent to the proxy server in terms of exceptions to the default parameters utilized by the proxy server.

For example, the user may first open their browser, via device 204, and input the address, e.g., the URL, of the gateway device 206. The user preference module 314 presents to the user what scan and response parameters can be selected. After the user enters his/her preferences, module 314 passes this data to module 312 for communication to the proxy server 218 and to database 316 for storage.

Examples of data stored in the database 316 may be scan options and response options. Scan options may be to delete junk emails, to clean virus infected e-mails, and to remove pornographic material from a web page. Response options might be deletion of an infected response or a notification e-mail to the user.

In some embodiments, the user preference data may be located at a negotiation phase between module 312 and proxy server 218. For example, the data may be read as 02 25 01 03, where 02 indicates a protocol version, 25 indicates the application type, 01 indicates the user's scan options, and 03 indicates that a notification e-mail is to be sent to the user when a virus is detected.

The request scan module 310 examines the protocols present in the request to determine if a request is for content, such as a request or retrieve protocol. If a content related protocol is found, the request scan module 310 communicates the request to the proxy module 312. The proxy module 312 modifies the original request by adding a redirection destination header, e.g., address header, which redirects the request to the proxy server. This may be viewed as encapsulating the request, as the original request is left intact. In some embodiments, the proxy module 312 may further modify the request to include user-defined parameters obtained from the user preference module 314.

High Level Flow Diagrams

Figure 4:
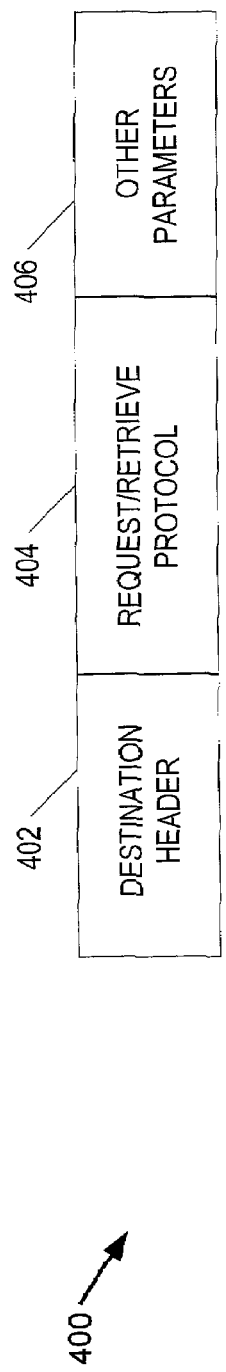
FIG. 4 illustrates a general example in the prior art of a request for content, such as an e-mail.

FIG. 4 illustrates a general example in the prior art of a request for content, such as an e-mail. The request 400 includes a destination header 402, a request/retrieve protocol 404, and other parameters 406 related to the request 400. The destination header 402 to a target server having access to the e-mail may be configured in accordance with a variety of address protocol standards, such as TCP/IP, etc. The request/retrieve protocol 404 may be configured in accordance with a variety of e-mail protocol standards, such as POP3 or IMAP4. The request scan module 310 of the redirection program 208 examines the request 400 to determine if a request/retrieve protocol 404 is present. If present, the request scan module 310 identifies the request as a content request and communicates the request to the proxy module 312. The proxy module 312 modifies the request 400 so that it is redirected to the proxy server.

Figure 5:
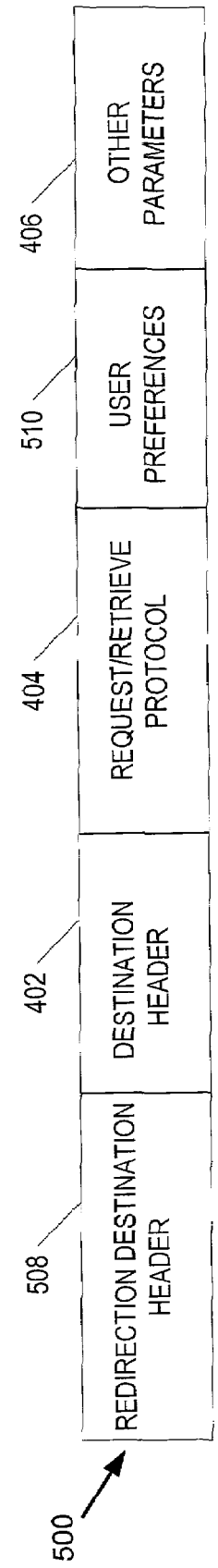
FIG. 5 illustrates one example of a modified request according to one embodiment of the present invention.

FIG. 5 illustrates one example of a modified request according to one embodiment of the present invention. As illustrated, the proxy module 312 adds a new redirection destination header 508 onto the original request 400. The new redirection destination header 508 encapsulates the original request 400 with a new address to the proxy server. As with the destination header 402, the redirection destination header 508 may be configured in accordance with a variety of address protocol standards, such as TCP/IP, etc.

In some embodiments, as earlier discussed with reference to FIG. 3, the proxy module 312 may further modify the original request by adding user preference data 510.

Upon receipt of the modified request, the proxy server removes the redirection destination header 508, e.g., unencapsulates the request, and forwards the request to the target server for processing. The proxy server may also remove the user preference data 510 prior to forwarding the request. Upon receipt of the response from the target server, the proxy server scans the request (including any attachments) for undesirable content and acts upon the response in accordance with default or user-defined parameters.

Figure 6A:
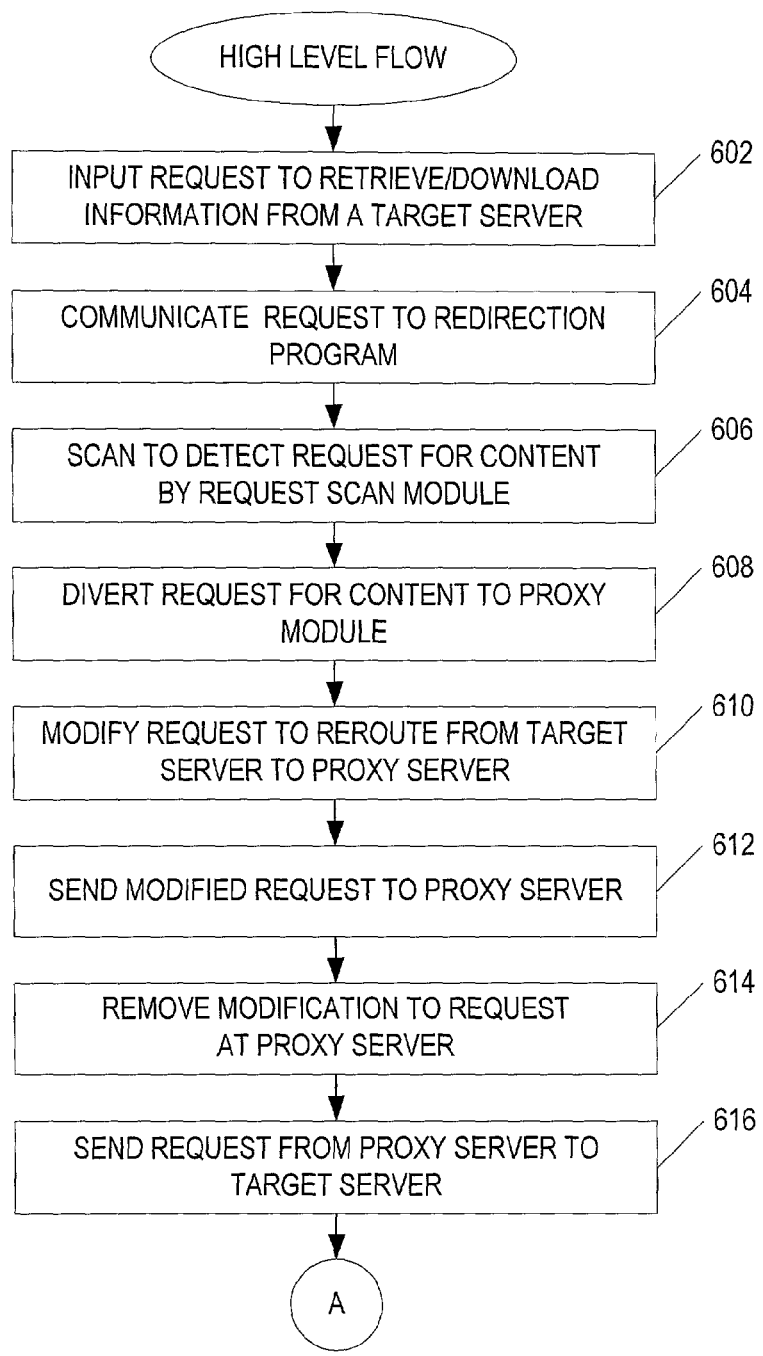
FIGS. 6A and 6B are a flow diagram illustrating one example of the high level flow for modifying a request to a target server so that it is redirected to a proxy server and for scanning a response for undesirable content at the proxy server according to one embodiment of the present invention.

FIG. 6A is a flow diagram illustrating one example of the high level flow for modifying a request to a target server so that it is redirected to a proxy server according to one embodiment of the present invention. At process 602, the user inputs the request for content via an input device, such as a keyboard on a computer connected to a network including the redirection program 208. As earlier described, the redirection program 208 may be resident on a network gateway device 206 on the network.

At process 604, the request is transmitted to the redirection program 208, for example, via a network gateway device including the redirection program 208.

At process 606, the request is scanned by the request scan module 310 of the redirection program 208 to determine if the request is a request for content, such as a listing of e-mails, an e-mail, an e-mail attachment, a downloadable file from a web site, etc.

When a request is scanned by scan module 310, the module 310 will first examine the request type. If the request type is to get e-mails or to access web sites, then it will communicate to with proxy module 312 to redirect the content request to proxy server 218. Other determination factors may include, but are not limited to FTP traffic, on-line chat, etc.

At process 608, if the request is a request for content, the request is communicated to the proxy module 312. If the request is not a request for content, the request is simply forwarded for further action, such as to other mechanisms of the gateway device 206 and/or for output from the network.

At process 610, the proxy module 312 reroutes the request to the proxy server 218. As earlier described with reference to FIGS. 4 and 5, in one embodiment, the proxy module 312 of the redirection program modifies the original request and encapsulates the original request by adding a redirection destination header. In some embodiments, the proxy module 312 may also add additional information related to user-defined preferences for processing of undesirable content at the proxy server.

As earlier described, the user-defined preferences are passed to the proxy module 312 from the user preference module 314. The proxy module 312 may store this data in memory, and then, each time a request is redirected to the proxy server 218, the proxy module 312 may send the user's preferences to the proxy server 218 at the negotiation phase of the connection.

At process 612, the modified request is sent from the redirection program to the proxy server, e.g., from the gateway device including the redirection program to the proxy server.

At process 614, the proxy server removes the modification to the request. Thus, in one embodiment, the proxy server removes the redirection destination header from the request, e.g., unencapsulates the request.

The proxy server 218 may also remove and store the user-defined parameters in a memory structure, and after a response is received from the target server, the proxy server 218 processes the response in accordance with the user-defined parameters.

At process 616, the proxy server sends the request to the target server.

When the target server receives the request, it will then process the request and retrieve the requested content, such as an e-mail. The target server will then send a response to the proxy server.

Figure 6B:
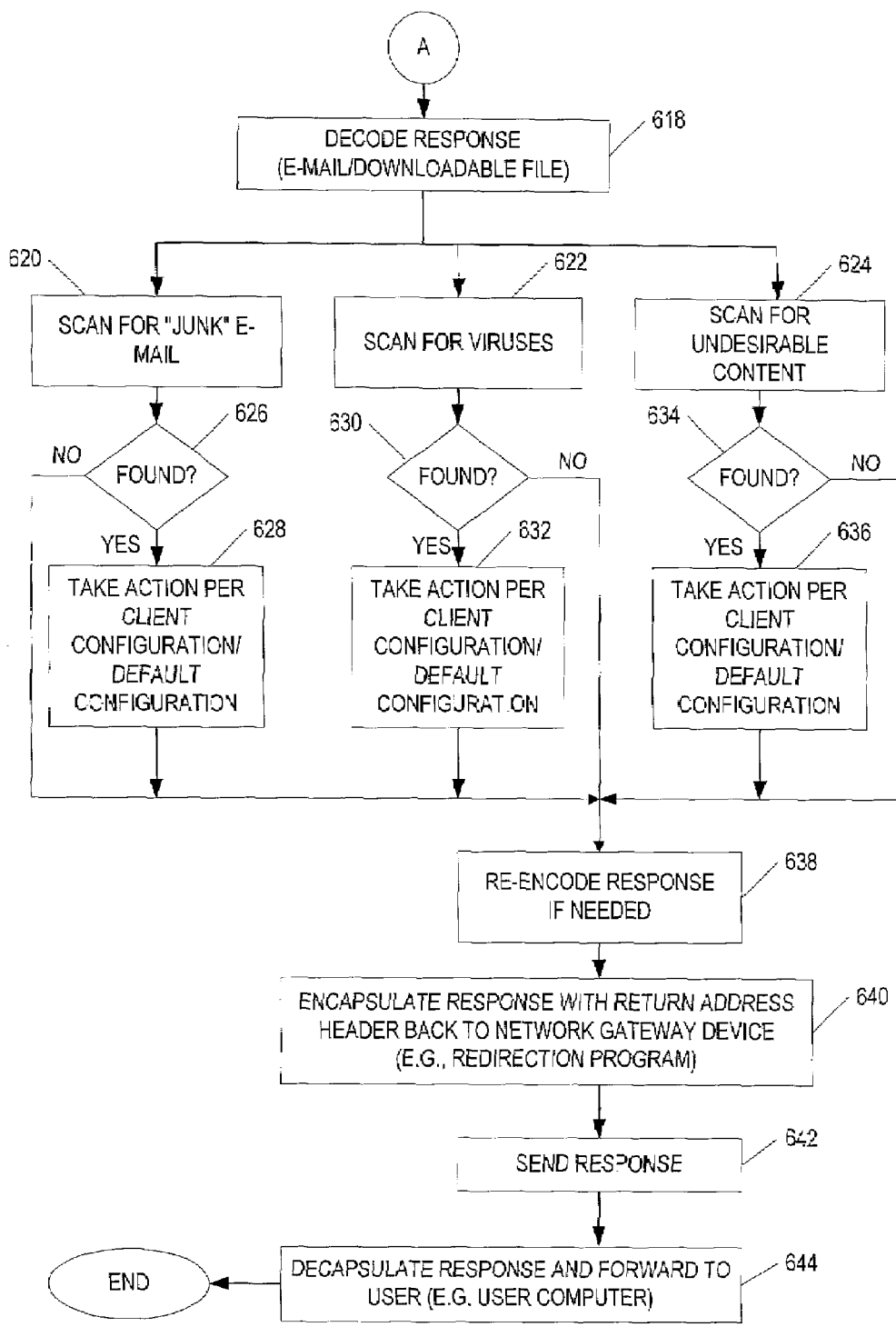

FIG. 6B is a flow diagram illustrating a high level flow for selectively scanning a response for undesirable content at a proxy server according to one embodiment of the present invention. At process 618, the proxy server receives the response from the target server and decodes the response, including any attachments. The decoded response, including any attachments, is then scanned for undesirable content at the proxy server. The proxy server may contain or be associated with one or several programs for detecting and/or removing undesirable content, such as junk e-mail, computer viruses, pornographic material, and other undesirable content. Thus, although the present flow diagram illustrates each of the scanning processes as independent selections, it will be appreciated that some or all of the scanning processes may be performed on the response, in either a serial or parallel manner.

At process 620, the decoded response, including any attachments, may be scanned for junk e-mails. In one embodiment, the response address header may be compared to a list of addresses defined as junk e-mail addresses that is present at the proxy server or associated with the proxy server. In other embodiments, the subject line may be scanned for key words defined as relating to junk e-mail. In further embodiments, the e-mail text may be scanned for key words defined as relating to junk e-mail.

At process 626, a determination is made as to whether the response is a junk email.

If the determination is negative, at process 638, the response is re-encoded, if necessary.

At process 640, the response is encapsulated with a return address header to the gateway device, which includes the redirection program, and, at process 642, sent to the gateway device.

At process 644, the redirection program, unencapsulates the response by removing the return address header, and forwards the response to the user, e.g., to the user's computer.

If the determination at process 626 is positive, at process 628, the response is acted upon according to default or user configurations for processing of the response, including the undesirable content, as earlier described with reference to FIG. 3. In one example, the entire junk e-mail response may be deleted. In another example, the body of the response may be replaced with a notification message to the user. In other examples, only the subject line may be sent to the user, or the subject line may be modified to highlight junk e-mail or to send the junk e-mail back to the sender.

After processing the response according to the default or user configurations for junk e-mails, the response, if any, and as modified, may be re-encoded at process 638, if necessary.

The response is then encapsulated and sent to the user as earlier described with reference to processes 640 through 644.

At process 622, the decoded response may be scanned for computer viruses. In one embodiment, the response may be scanned by one or more anti-viral applications.

At process 630, a determination is made as to whether the response contains a computer virus.

If the determination at process 630 is negative, the response is processed as earlier described with reference to processes 638 through 644.

If the determination at process 630 is positive, at process 632, the response is acted upon according to default or user configurations for processing computer viruses. In one example, the response may be "cleaned", e.g., the computer virus removed. The cleaned file may then be encoded by the original method which the user utilized, and then set back to the user. In other examples, the infected file may be deleted, quarantined, or by-passed (no action taken).

In another embodiment, the entire response may be deleted. In another example, the computer virus may be deleted and replaced with a notification message. In another example, the response and/or the computer virus may be quarantined for later retrieval. In another example, the entire response may be forwarded with a warning notification message.

After processing the response according to the default or user configurations for computer viruses, the response, if any, and as modified, may be re-encoded at process 638, if necessary.

The response is then encapsulated and sent to the user as earlier described with reference to processes 640 through 644.

At process 624, the decoded response may be scanned for undesirable content, such as pornographic content. In one embodiment, the response may be scanned by one or more pornographic detection applications. The response may also be scanned by anti-spam or other content filtering applications for other undesirable content.

At process 634, a determination is made as to whether the response contains undesirable content.

If the determination at process 634 is negative, the response is processed as earlier described with reference to processes 638 through 644.

If the determination at process 634 is positive, at process 636, the response is acted upon according to default or user configurations for processing the undesirable content. In one example, the entire response may be deleted. In another example, the body of the response may be replaced with a notification message to the user. In other examples, only the subject line may be sent to the user, or the subject line may be modified to highlight junk e-mail or to send the junk e-mail back to the sender.

After processing the response according to the default or user configurations for undesirable content, the response, if any, and as modified, may be re-encoded at process 638, if necessary.

The response is then encapsulated and sent to the user as earlier described with reference to processes 640 through 644.

In some embodiments of the present invention, the undesirable content may be quarantined at the proxy server or in a memory structure or database accessible by the proxy server. For example, computer viruses may be saved in a quarantine memory structure to enable anti-viral applications to be developed. In another example, junk e-mails may be quarantined to enable further action to be taken with regard to the senders.

Alternative Embodiment

An embodiment of the present invention has been herein described in which the request from a user to a target server has been redirected through a proxy server using an encapsulation of the original request, i.e., the addition of a redirection destination header.

In an alternative embodiment, the redirection may be implemented by establishing a secure session between the redirection program, e.g., the device including the redirection program, such as a network gateway device, and the proxy server.

Figure 7:
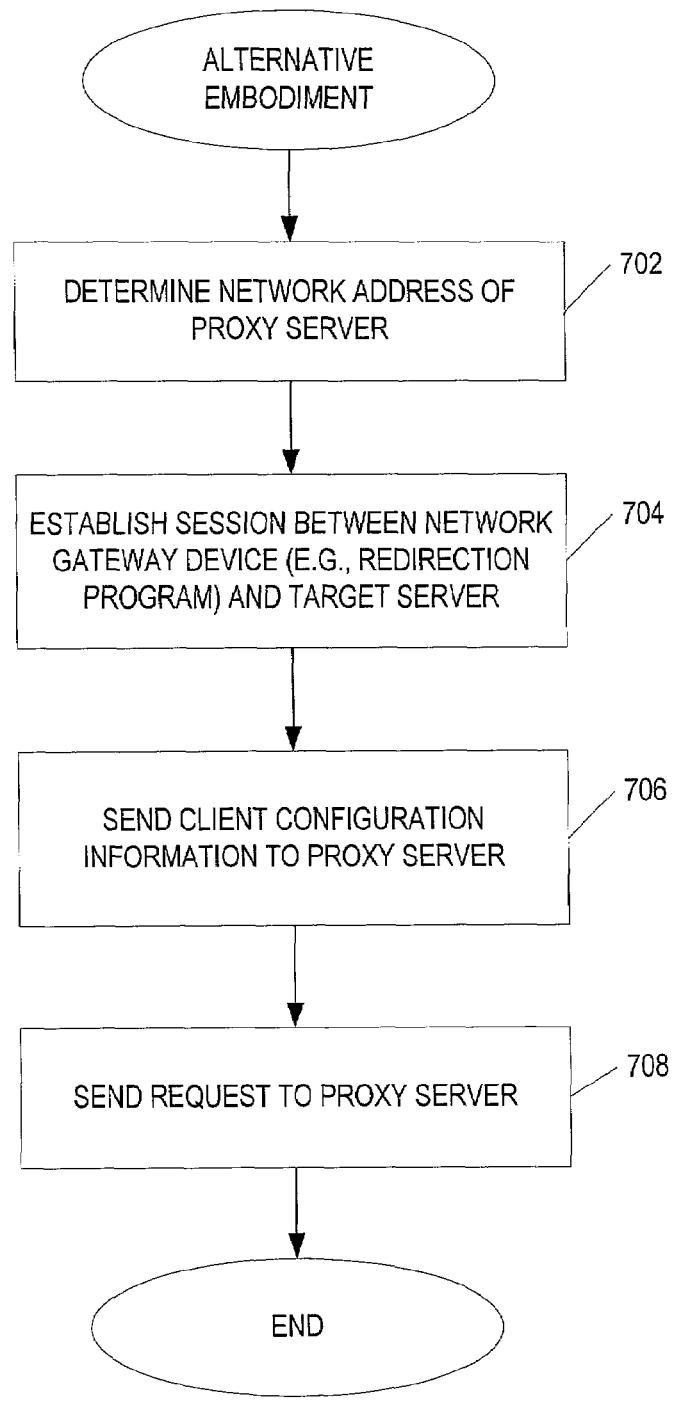
FIG. 7 is a flow diagram illustrating an alternative embodiment for redirecting a request from a user to a proxy server.

FIG. 7 is a flow diagram illustrating a method for redirecting a request from a user to a proxy server according to this alternative embodiment of the present invention. The present embodiment will be described using a network gateway device, as earlier described with reference to FIGS. 2 through 6B. The processes of FIG. 7 may be used in place of processes 610-616. Thus, in this embodiment, once the request scan module of the redirection program identifies a request as a content request in process 606, the request scan module communicates the request to the proxy module in process 608. Then, as now described, the proxy module, rather than modifying the request, establishes a session with the proxy server via the network gateway device.

At process 702, the network gateway device, including the redirection program, determines the network address of the proxy server, e.g., the IP address.

At process 704, the proxy module, via the gateway device, establishes a session with the proxy server with authentication. In one example, the session may be established using SOCKS4, SSL, a proprietary session protocol, or some other session protocol. The authentication may be made using any authentication technique, such as a challenged response.

At process 706, the proxy module, via the gateway device, sends the user configuration data to the proxy server. In one embodiment, the proxy module obtains the user configuration data from the user preference module for sending to the proxy server, as earlier described with reference to FIG. 3. It is preferred that the user configuration data be communicated before the request so that the proxy server has access to the user preferences when dealing with the request. Although this order is preferred for more efficient programming, it is not required.

At process 708, the proxy module, via the gateway device, sends the original request to the proxy server.

In this embodiment, different from the earlier encapsulation embodiment, the original request is not modified prior to sending to the proxy server. In this alternative embodiment, the response does not have to be encapsulated with a return address header. This alternative embodiment is connection oriented. The return address header uniquely identifies not only the redirection module but also the exact recipient since there may be more than one recipient, e.g., a process or an application, serviced by the same redirection program.

Figure 8A:
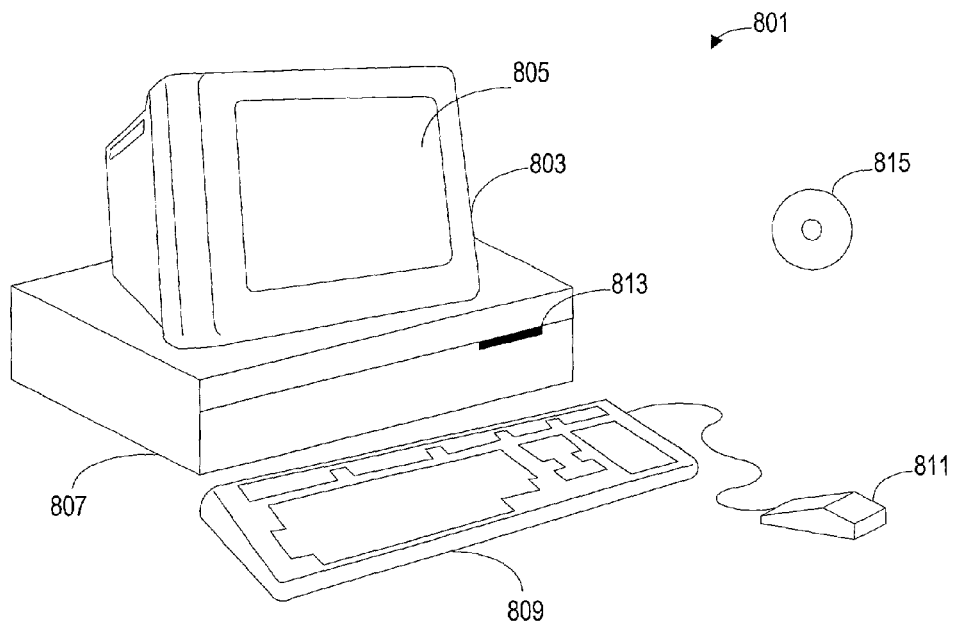
FIGS. 8A and 8B illustrate an example of a computer system suitable for use in implementing the proxy server of the present invention.
Figure 8B:
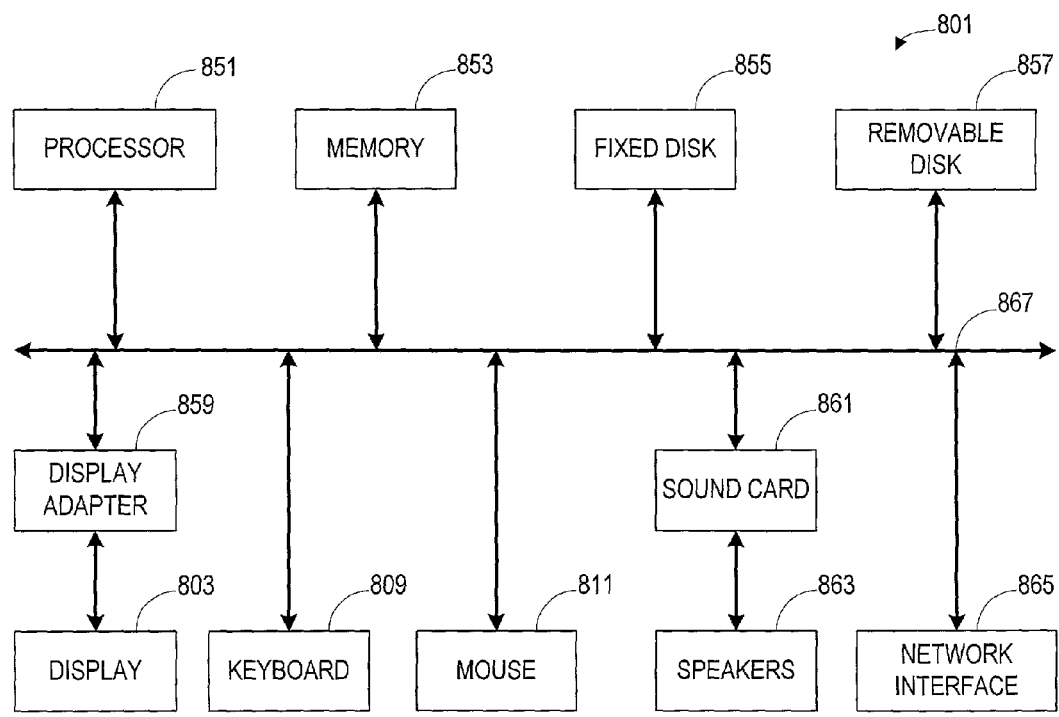

FIGS. 8A and 8B illustrate an example of a computer system suitable for use in implementing the proxy server of the present invention. FIG. 8A shows a computer system 801 that includes a display monitor 803 having a display 805 (or multiple displays), cabinet 807, keyboard 809, and mouse 811. Cabinet 807 houses a drive 813, such as a CD-ROM or floppy drive, system memory and a hard drive (see FIG. 8B) which may be utilized to store and retrieve programs incorporating computer code that implements the proxy server functions, such as scanning, deletion, modification, and quarantine of undesirable content, data for use by the proxy server, and the like. Although CD-ROM 815 is shown as an exemplary computer readable storage medium, other computer readable storage media including floppy disk, tape, flash memory, system memory, and hard drive may be utilized. Additionally, a data signal embodied in a carrier way (e.g., in a network including the Internet) may be the computer readable storage medium. In one implementation, an operating system for the computer system 801 is provided in the system memory, the hard drive, the CD-ROM 815, or other computer readable storage medium and serves to incorporate the computer code that implements the invention.

FIG. 8B shows a system block diagram of a computer system 801 used to execute the proxy server functions of the present invention including the scanning, deletion, modification, and quarantine of undesirable content, used by the proxy server of the present invention. As in FIG. 8A, computer system 801 includes display monitor 803 and keyboard 809, and mouse 811. Computer system 801 further includes subsystems such as a central processor 851, system memory 853, fixed storage 855 (e.g., hard drive), removable storage 857 (e.g., CD-ROM drive), display adapter 859, sound card 861, speakers 863, and network interface 865. The central processor 851, may execute computer program code (e.g., an operating system) to implement the various components of the proxy server of the present invention as described herein, and/or may in combination with another subsystem implement the proxy server functions of the present invention. The operating system is normally, but not necessarily, resident in the system memory 853 during its execution. Other computer systems suitable for use with the invention may include additional subsystems or fewer subsystems. For example, another computer system could include more than one processor 851 (i.e., a multi-processor system) or one or more levels of cache memory.

The system bus architecture of computer system 801 is represented by arrows 867. However, these arrows are illustrative of any interconnection scheme serving to link the subsystems. For example, a local bus could be utilized to connect the central processor to the system memory and display adapter. Computer system 801 shown in FIG. 8B is but an example of a computer system suitable for use with the present invention. Other computer architectures having different configurations of subsystems may also be utilized.

Thus, there has been described herein a system and method for identifying undesirable content in responses sent in reply to a user request for content, such as e-mail or downloadable files. The present invention utilizes a redirection program that identifies content requests from a user to a target server. The redirection program redirects the request to a proxy server that sends the request to the target server. Upon receipt of the response from the target server, the proxy server scans the response, which includes any attachments, for undesirable content, such as junk e-mails, computer viruses, pornographic material, and/or other undesirable content. The proxy server then acts upon the response, and any undesirable content, in accordance with default or user-defined parameters, such as removal of the undesirable content. The proxy server may then send the response, as modified, or a notification message to the redirection program forwarding to the user.

Although the present invention has been herein described with regard to identification, and, in some instances, processing of, undesirable content such as junk e-mails, computer viruses, pornographic material, it will be appreciated that the present invention may be extended to other types of undesirable content, such as advertisements.

Further, although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A system for identifying a computer virus in a response received in reply to a user request, the system comprising:
   a user input device that generates a user request including a protocol field;
   a network component that executes a redirection program, the redirection program including a scan module that receives the user request before the request is processed for transmission to either a target server or to a destination server and is capable of identifying the request as a request for content by scanning the protocol field and identifying a protocol that is only for requesting and retrieving content and the redirection program also including a proxy module that modifies the request by adding a redirection destination header to the request so that it is redirected to a proxy server if the protocol is only for requesting and retrieving content, and wherein the proxy module leaves the user request unaltered if the protocol is not only for requesting and retrieving content, such that no redirection destination header is added and the user request is forwarded for processing by a gateway device and for transmission to the destination server;
   a network that routes the request to the proxy server; and
   the proxy server that receives user-defined configuration data during a negotiation phase of establishing a connection between the proxy module and proxy server, receives the request, removes the redirection destination header, forwards the request to the target server, and receives a response from the target server, the proxy server having a decoding module for decoding the response a content scanning module to scan a decoded response and a user-defined configuration data scanning module to apply user-defined configuration data to the decoded response and a return address appending module.

2. The system of claim 1 wherein the proxy server identifies the computer virus in the response and processes the response according to defined parameters.

3. The system of claim 2, wherein the proxy server sends at least a portion of the response to the user, the portion of the response not including the computer virus.

4. The system of claim 2, wherein the proxy server sends a notification message back to the user, the notification message containing data related to the computer virus.

5. The system of claim 1, further comprising:
   a user preference module that receives user-defined parameters utilized by the proxy server when processing the response.

6. The system of claim 1, wherein the proxy module redirects the request to the proxy server by modifying the request.

7. The system of claim 6, wherein the proxy module modifies the request by adding a redirection destination header to the request.

8. The system of claim 1, wherein the proxy server further quarantines the computer virus.

9. The system of claim 1, wherein the defined parameters are proxy server default parameters.

10. The system of claim 1, wherein the defined parameters are user-defined parameters.

11. The system of claim 1, wherein the defined parameters are a combination of user-defined parameters and proxy server default parameters.

12. The system of claim 1, wherein the scan module and the proxy module are located in the network gateway device.

13. The system of claim 1, wherein the network gateway device further comprises a firewall and a router.

14. A method for identifying undesirable content in responses received in reply to a user request, the method comprising:
   receiving, at a redirection program executing on a network computing device, input from a user computer including at least one request, the request having a protocol field;

before the request is transmitted on a network, scanning at a scan module in the redirection program the protocol field of the request to determine whether a protocol of the request is only for requesting and retrieving content;

if the protocol of the request is only for requesting and retrieving content, at a proxy module in the redirection program, modifying the request by adding a redirection destination header to the request, thereby redirecting the request to a proxy server from where the user request is transmitted to a target server;

if the protocol of the request is not only for requesting and retrieving content, at the proxy module in the redirection program, passing the request unaltered such that the request bypasses the proxy server and is processed by a gateway network device and is transmitted to a destination server;

receiving the request at the proxy server;

receiving user-defined configuration data at the proxy server during a negotiation phase of establishing a connection between the proxy module and proxy server;

removing the redirection destination header from the request at the proxy server;

sending the request from the proxy server to the target server for generation of a response;

receiving a response from the target server at the proxy server;

decoding the response at the proxy server;

scanning the decoded response for a computer virus, junk e-mail, or pornographic content at the proxy server;

if a computer virus, junk e-mail, or pornographic content is detected, processing the decoded response at the proxy server according to the user-defined configuration data, re-encoding the response and appending a return address so that the response is sent to the user computer; and if a computer virus, junk e-mail, or pornographic content is not detected, re-encoding the response and appending the return address so that the response is sent to the user computer.

15. The method of claim 14, further comprising:
identifying the undesirable content in the response;
modifying the response to remove the undesirable content; and
sending the modified response from the proxy server to the user computer.

16. The method of claim 14, wherein the request is redirected to the proxy server by establishing a session with the proxy server.

17. The method of claim 14, further comprising:
receiving input of at least one user-defined parameter at the proxy module which stores the parameter in a database and may forward to the proxy server during negotiation phase of the connection with the proxy server.

18. The method of claim 17, wherein the user-defined parameter is input using a browser application.

19. The method of claim 17, wherein the user-defined parameter is sent to the proxy server by modifying the request.

20. The method of claim 17, wherein the user-defined parameter is sent to the proxy server during a session established with the proxy server.

21. The method of claim 14 further comprising:
storing the user-defined configuration data at the proxy module.

22. The method of claim 14 further comprising:
storing the user-defined configuration data at the proxy server.

23. The method of claim 14 further comprising:
retrieving the previously stored user-defined configuration data at the proxy server when processing the decoded response.

* * * * *

UNITED STATES PATENT AND TRADEMARK OFFICE
CERTIFICATE OF CORRECTION

PATENT NO. : 7,640,434 B2  Page 1 of 1
APPLICATION NO. : 10/043910
DATED : December 29, 2009
INVENTOR(S) : Lee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1094 days.

Signed and Sealed this

Ninth Day of November, 2010

David J. Kappos
*Director of the United States Patent and Trademark Office*